(12) United States Patent
Hashimoto et al.

(10) Patent No.: US 12,466,425 B2
(45) Date of Patent: Nov. 11, 2025

(54) INFORMATION PROCESSING DEVICE, INFORMATION PROCESSING SYSTEM, INFORMATION PROCESSING METHOD, AND NON-TRANSITORY STORAGE MEDIUM STORING A PROGRAM

(71) Applicant: TOYOTA JIDOSHA KABUSHIKI KAISHA, Aichi-ken (JP)

(72) Inventors: Osami Hashimoto, Mishima (JP); Hiroki Tashima, Fujisawa (JP); Toshihiko Inoue, Nagoya (JP); Kazuma Toya, Anjo (JP); Takashi Tazoe, Nagoya (JP); Ryota Bingo, Nisshin (JP); Kosuke Sakakibara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 169 days.

(21) Appl. No.: 18/479,827

(22) Filed: Oct. 3, 2023

(65) Prior Publication Data

US 2024/0149902 A1 May 9, 2024

(30) Foreign Application Priority Data

Nov. 9, 2022 (JP) ................................ 2022-179842

(51) Int. Cl.
*B60W 50/14* (2020.01)
*B60W 40/06* (2012.01)
*G06V 20/13* (2022.01)

(52) U.S. Cl.
CPC ............ *B60W 50/14* (2013.01); *B60W 40/06* (2013.01); *G06V 20/13* (2022.01); *B60W 2050/146* (2013.01); *B60W 2555/20* (2020.02); *B60W 2556/40* (2020.02); *B60W 2556/50* (2020.02)

(58) Field of Classification Search
CPC ................. B60W 50/14; B60W 40/06; B60W 2050/146; B60W 2555/20; B60W 2556/40; B60W 2556/50; G06V 20/13; G06V 20/588
See application file for complete search history.

(56) References Cited

U.S. PATENT DOCUMENTS

| | | | |
|---|---|---|---|
| 5,315,295 A | 5/1994 | Fujii | |
| 2022/0065639 A1* | 3/2022 | Mistele | G01C 21/3446 |
| 2022/0357172 A1* | 11/2022 | Lang | G01C 21/3608 |
| 2023/0127182 A1* | 4/2023 | Mayster | G06V 20/182 |
| | | | 701/423 |
| 2023/0326366 A1* | 10/2023 | Fields | G09B 19/14 |
| | | | 434/65 |

FOREIGN PATENT DOCUMENTS

| | | |
|---|---|---|
| JP | H04236699 A | 8/1992 |
| JP | 2020187496 A | 11/2020 |
| JP | 2021-025931 A | 2/2021 |

* cited by examiner

*Primary Examiner* — Omeed Alizada
(74) *Attorney, Agent, or Firm* — HAUPTMAN HAM, LLP (57) ABSTRACT

An information processing device includes: a satellite image acquisition section that is configured to acquire a satellite image captured by an artificial satellite; a weather information acquisition section that is configured to acquire weather information for a region corresponding to the satellite image; and an information output section that is configured to output information relating to a road surface condition for the region, which is estimated based on the satellite image and the weather information.

8 Claims, 7 Drawing Sheets

INFORMATION PROCESSING DEVICE, INFORMATION PROCESSING SYSTEM, INFORMATION PROCESSING METHOD, AND NON-TRANSITORY STORAGE MEDIUM STORING A PROGRAM

CROSS-REFERENCE TO RELATED APPLICATION

This application is based on and claims priority under 35 USC 119 from Japanese Patent Application No. 2022-179842 filed on Nov. 9, 2022, the disclosure of which is incorporated by reference herein.

BACKGROUND

Technical Field

The present disclosure relates to an information processing device, an information processing system, an information processing method, and a non-transitory storage medium storing a program.

Related Art

Japanese Patent Application Laid-Open (JP-A) No. 2021-25931 discloses a device that calculates at least one of a degree of risk of a candidate for a travel route from a current location to a destination, or a load on an occupant of a vehicle that is subject to autonomous driving control. In particular, the device described in Japanese Patent Application Laid-Open (JP-A) No. 2021-25931 is configured to calculate a road surface condition of a travel route based on signals from a group of sensors that detect a surrounding environment of a vehicle.

However, the device described in Japanese Patent Application Laid-Open (JP-A) No. 2021-25931 calculates the road surface condition using a sensor such as a camera that is installed at the vehicle, and therefore, an occupant cannot grasp the road surface condition of a wide range of roads.

SUMMARY

The present disclosure provides an information processing device, an information processing system, an information processing method, and a non-transitory storage medium storing a program, which enable a user to grasp a road surface condition of a wide range of roads.

An information processing device according to a first aspect is configured to: acquire a satellite image captured by an artificial satellite; acquire weather information for a region corresponding to the satellite image; and output information relating to a road surface condition for the region, which is estimated based on the satellite image and the weather information.

The information processing device according to the first aspect estimates a road surface condition based on a satellite image captured by an artificial satellite and weather information. Since the artificial satellite can capture an image of a wide range of road surfaces of an arbitrary region, the road surface condition of a wide range of roads can be estimated.

Further, by outputting the information relating to the estimated road surface condition, a user can grasp the road surface condition.

An information processing device according to a second aspect is the information processing device according to the first aspect, wherein the information processing device is configured to cause display of the information relating to the road surface condition at a display area that is provided inside a vehicle cabin.

The information processing device according to the second aspect enables an occupant of a vehicle to grasp the road surface condition by causing display of the information relating to the road surface condition at a display area that is provided inside a vehicle cabin.

An information processing device according to a third aspect is the information processing device according to the second aspect, wherein the information processing device is configured to cause display of map information for vehicle surroundings at the display area, and causes display of the information relating to the road surface condition on the map information.

The information processing device according to the third aspect enables an occupant of the vehicle to easily grasp the road surface condition simply by looking at the map information due to the information relating to the road surface condition being displayed on the map that is displayed at the display area.

An information processing device according to a fourth aspect is the information processing device according to the first aspect, wherein the information processing device is configured to output information including a location of a road that is estimated to be frozen, as the information relating to the road surface condition.

In the information processing device according to the fourth aspect, it is possible to grasp a road that requires attention regarding slipping due to freezing, before travel.

An information processing device according to a fifth aspect is the information processing device according to the first aspect, wherein the information processing device is configured to output information including a location of a road that is covered with fallen leaves, as the information relating to the road surface condition.

In the information processing device according to the fifth aspect, it is possible to grasp a road that requires attention regarding slipping due to fallen leaves, before travel.

An information processing device according to a sixth aspect is the information processing device according to the first aspect, wherein the information processing device is configured to output information including a location of a road on which snow has accumulated, as the information relating to the road surface condition.

In the information processing device according to the sixth aspect, a user can grasp a road that requires preparation in advance due to snowfall, before travel.

An information processing system according to a seventh aspect includes the information processing device according to any one of the second aspect to the sixth aspect, and a display device that causes display of the information relating to the road surface condition at the display area.

In the information processing system according to the seventh aspect, the information processing device is configured to cause, by the display device, display of the information relating to the road surface condition at the display area, thereby enabling an occupant to easily grasp the road surface condition.

An information processing method according to an eighth aspect acquires a satellite image captured by an artificial satellite; acquires weather information for a region corresponding to the satellite image; and outputs information relating to a road surface condition for the region, which is estimated based on the satellite image and the weather information.

A non-transitory storage medium storing a program according to a ninth aspect is a non-transitory storage medium storing a program that is executable by a computer to perform processing, the processing including: acquiring a satellite image captured by an artificial satellite; acquiring weather information for a region corresponding to the satellite image; and outputting information relating to a road surface condition for the region, which is estimated based on the satellite image and the weather information.

The information processing device, the information processing system, the information processing method, and the non-transitory storage medium storing a program according to the present disclosure enable a user to grasp the road surface condition of a wide range of roads.

BRIEF DESCRIPTION OF THE DRAWINGS

An exemplary embodiment of the present disclosure will be described in detail based on the following figures, wherein.

DETAILED DESCRIPTION

Explanation follows regarding an information processing system S including an onboard unit 28 according to an exemplary embodiment, with reference to the drawings.

Figure 1:
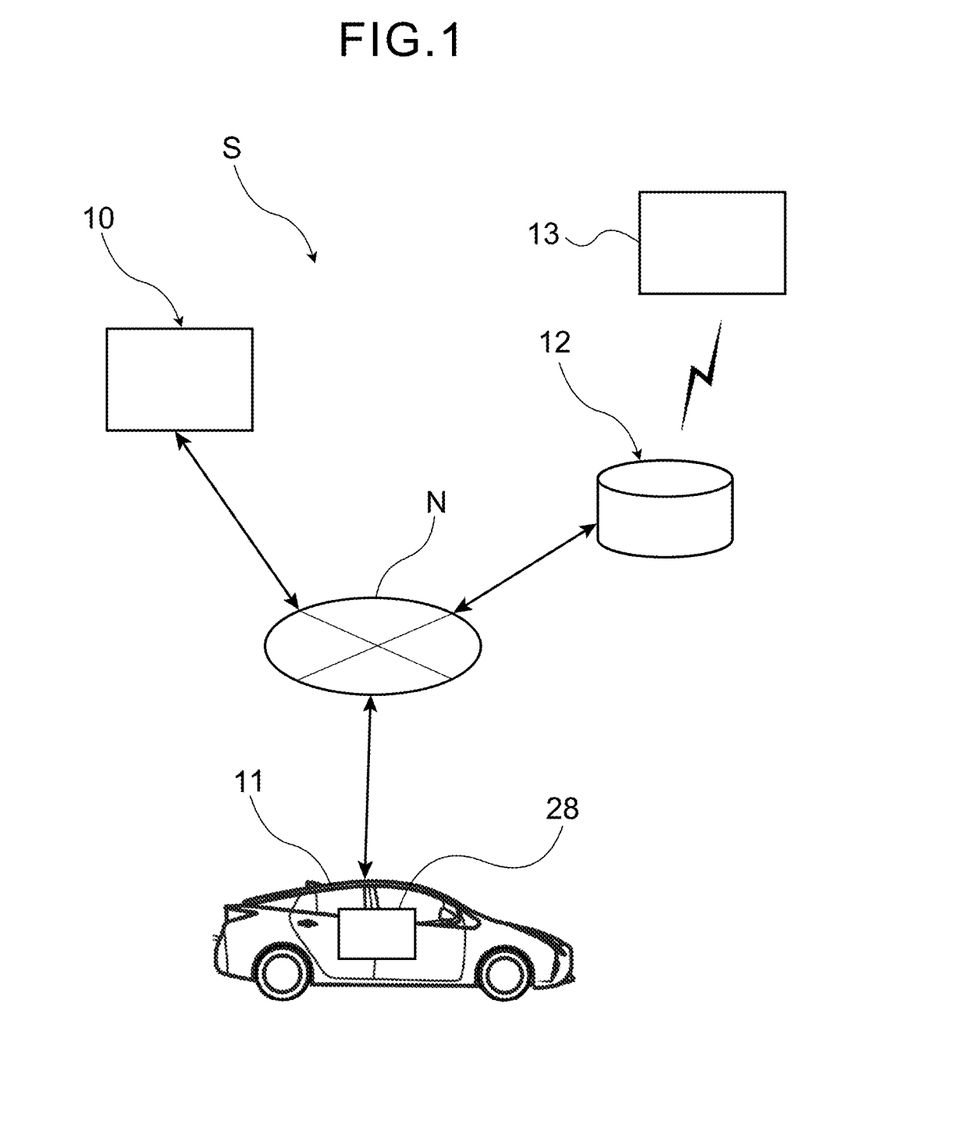
FIG. 1 is a schematic diagram schematically illustrating the entire system according to an exemplary embodiment.

As illustrated in FIG. 1, an information processing system S according to the present exemplary embodiment includes an information processing device 10, a server 12, and a vehicle 11. The information processing device 10, the server 12, and the vehicle 11 are connected via a network N so as to be capable of communicating with each other.

The information processing device 10 is installed outside the vehicle 11, for example, and is configured to transmit requested information in response to an instruction received from the vehicle 11. Moreover, the information processing device 10 is configured so as to be able to acquire various information from the server 12 via the network N. Note that the information processing device 10 may be connected to plural vehicles 11 via the network N.

The vehicle 11 includes an onboard unit 28. The server 12 is installed outside the vehicle 11, and is configured so as to be capable of receiving data from an artificial satellite 13. Accordingly, the server 12 stores satellite images captured by an artificial satellite. Weather information is sequentially accumulated at the server 12. Note that the weather information stored in the server 12 can be acquired from a meteorological bureau, privately owned organizations that perform services of providing weather information, and the like.

The information processing device 10 of the present exemplary embodiment is a device that acquires, via the server 12, satellite images captured by the artificial satellite 13 and weather information, and outputs information relating to the road surface condition of the relevant region, which is estimated based on the satellite images and the weather information.

Figure 2:
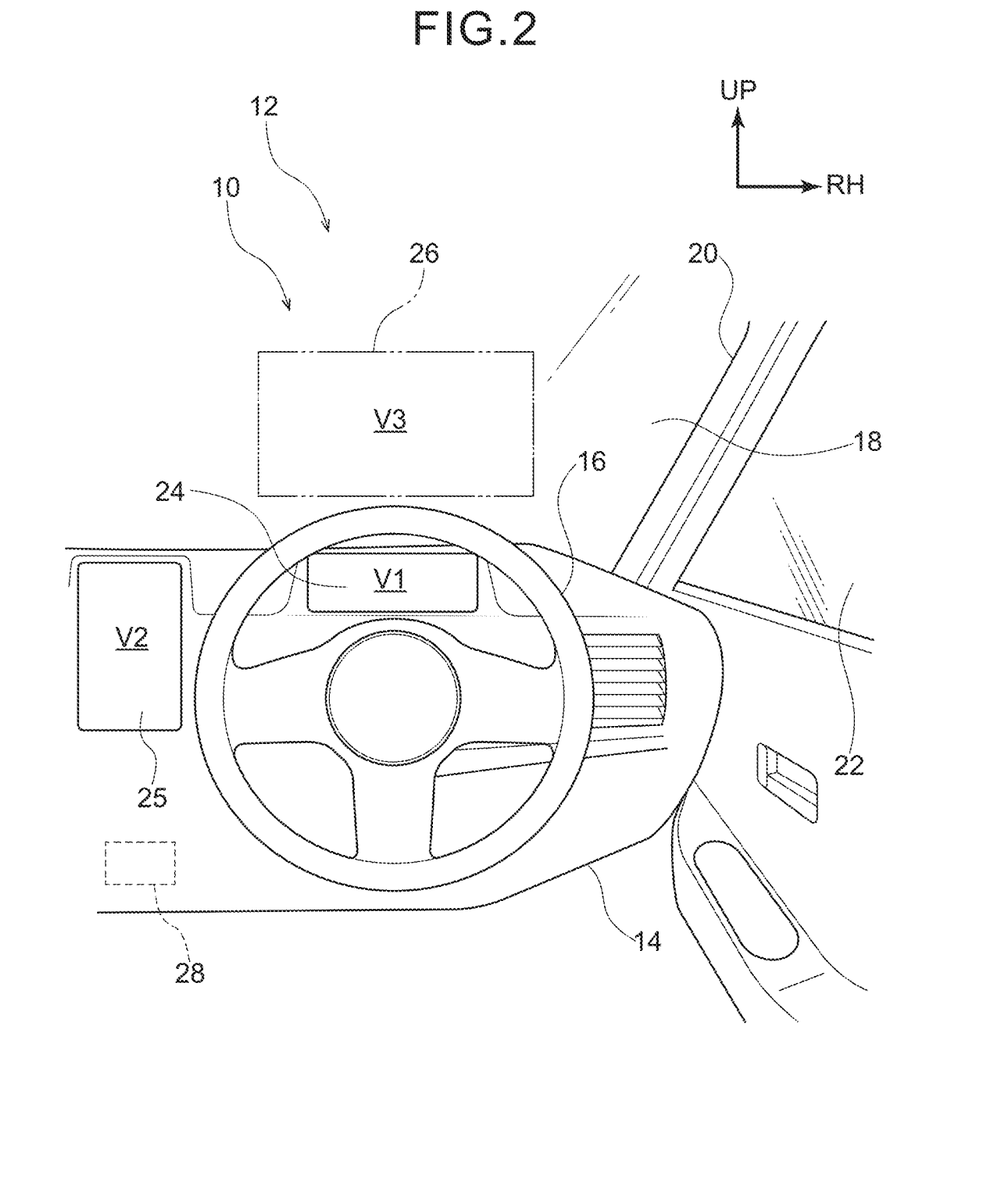
FIG. 2 is a schematic diagram illustrating a front part inside a vehicle cabin, viewed from a vehicle rearward side, of a vehicle to which an information processing device according to an exemplary embodiment has been applied.

FIG. 2 is a schematic diagram illustrating a front part inside a vehicle cabin, viewed from a vehicle rearward side, of the vehicle 11 in the exemplary embodiment. Note that the arrow UP illustrated in FIG. 2 indicates an upper side in a vehicle vertical direction, and the arrow RH indicates a right side in a vehicle width direction. The vertical direction and the left-right direction in the following explanation respectively mean the vertical direction in the vehicle vertical direction and the left-right direction in the vehicle width direction.

As illustrated in FIG. 2, an instrument panel 14 is provided at a front part inside a vehicle cabin of the vehicle 11. The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided on the right side, and a driver's seat is installed on the right side of the vehicle. Note that there is no limitation thereto, and the present disclosure may be applied to a vehicle in which the driver's seat is installed on the left side of the vehicle.

A windshield glass 18 is provided at a front end part of the instrument panel 14. The windshield glass 18 extends in the vehicle vertical direction and the vehicle width direction to partition the vehicle cabin interior from an exterior of the vehicle cabin.

A vehicle right side end part of the windshield glass 18 is fixed to a front pillar 20 on the vehicle right side. The front pillar 20 extends in the vehicle vertical direction, and the windshield glass 18 is fixed to an inner side end part of the front pillar 20 in the vehicle width direction. Further, a front end part of a front side glass 22 is fixed to an outer side end part of the front pillar 20 in the vehicle width direction. Note that a vehicle left side end part of the windshield glass 18 is fixed to a front pillar (not shown) on the left side of the vehicle 11.

A first display 24, which includes a display area V1 for an image, is provided at the instrument panel 14. The first display 24 is configured by a meter display that is provided facing the driver's seat, at the vehicle right side of the instrument panel 14. The first display 24 is connected to various meter devices installed at the vehicle 11, and is provided at a position that enters a field of view of a driver in a state in which the driver has oriented their line of sight forward of the vehicle.

The instrument panel 14 is provided with a second display 25, which includes a display area V2 for an image. The second display 25 is configured by a center display that is provided at a central portion of the instrument panel 14 in the vehicle width direction.

A third display 26, which includes a display area V3 for an image, is provided at the windshield glass 18. The third display 26 is set at a vehicle upper side of the first display 24, and is configured by a projection plane that is projected by a head-up display device 46 (see FIG. 2) serving as a display device. More specifically, the head-up display device 46, which is capable of projecting an image, is provided at a vehicle front side of the instrument panel 14, and an image is projected onto the third display 26 of the windshield glass 18 from the head-up display device 46. Namely, the third display 26 is a part of the windshield glass 18 serving as a projection surface of the head-up display device 46.

Note that the vehicle 11 is provided with the onboard unit 28. The onboard unit 28 of the present exemplary embodiment is, for example, an electronic control unit (ECU) that performs various control.

Hardware Configuration of the Information Processing Device 10

Figure 3:
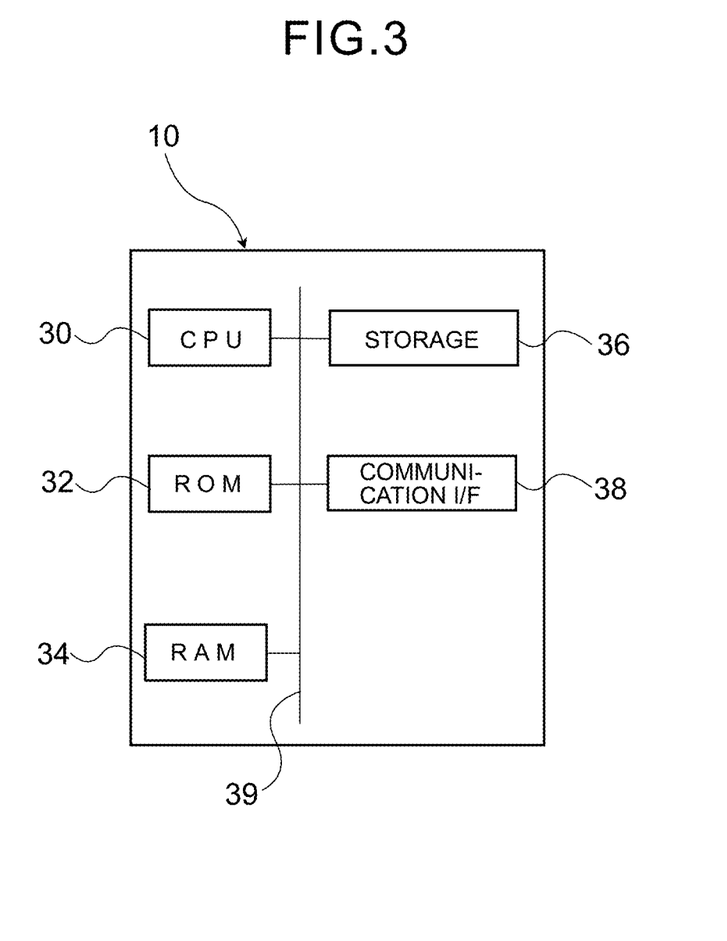
FIG. 3 is a block diagram illustrating a hardware configuration of an information processing device according to an exemplary embodiment.

As illustrated in FIG. 3, the information processing device 10 includes a central processing unit (CPU; serving as a processor) 30, read only memory (ROM) 32, random access memory (RAM) 34, storage 36, and a communication interface (communication I/F) 38. These respective configurations are communicably connected to each other via an internal bus 39.

The CPU 30 is a central processing unit that executes various programs and controls various components. Namely, the CPU 30 reads a program from the ROM 32 or the storage 36, and executes the program using the RAM 34 as a workspace. Further, the CPU 30 controls the respective configurations described above and performs a variety of computation processing in accordance with programs stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and is a non-transitory storage medium that stores various programs including an operating system, as well as various data. In the present exemplary embodiment, a display program or the like for performing display processing is stored in the ROM 32 or the storage 36.

The communication I/F 38 is an interface for the information processing device 10 to communicate with the server 12, the onboard unit 28, and other devices and, for example, a protocol such as a controller area network (CAN), Ethernet (registered trademark), long term evolution (LTE), a fiber distributed data interface (FDDI), or Wi-Fi (registered trademark) is used.

Hardware Configuration of the Onboard Unit 28

Figure 4:
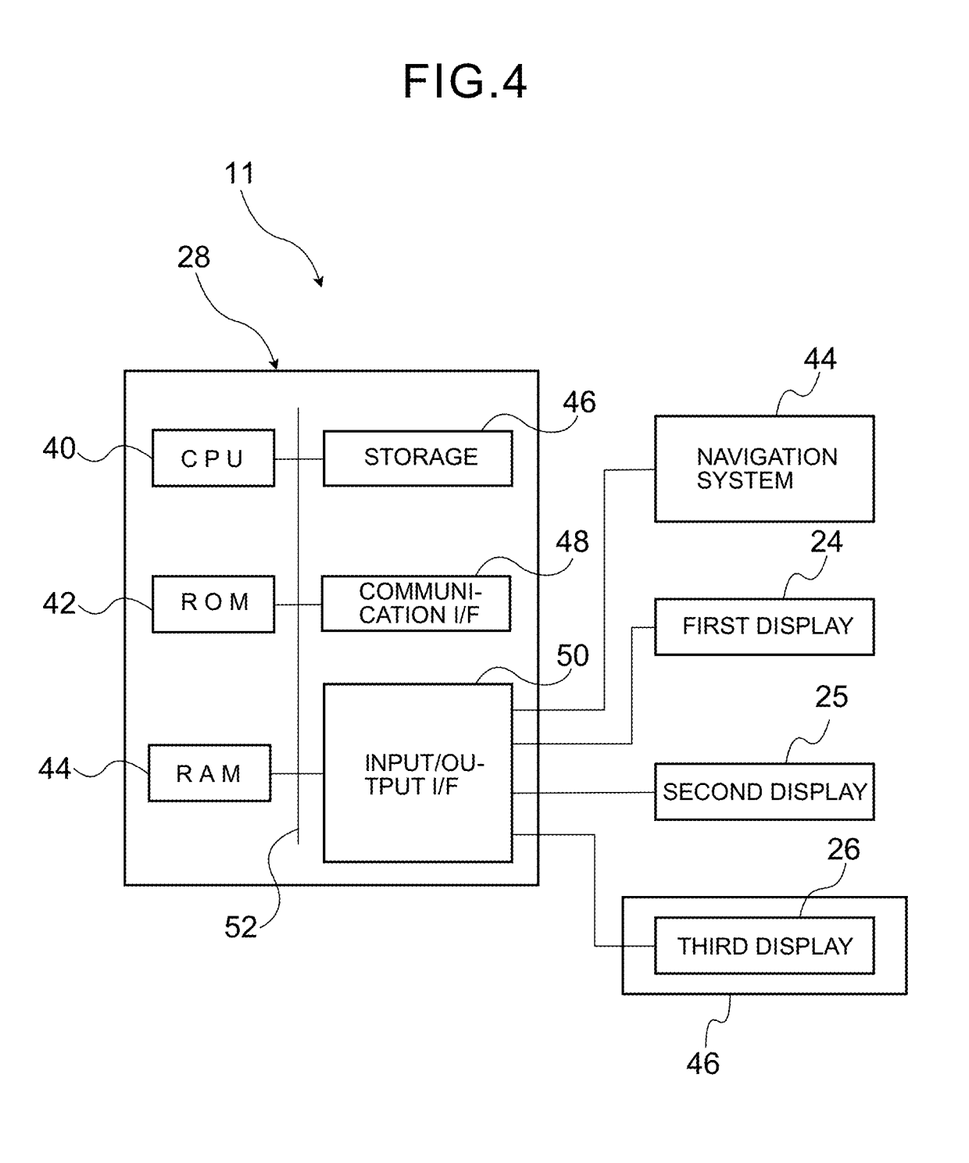
FIG. 4 is a block diagram illustrating a hardware configuration of an onboard unit in an exemplary embodiment.

As illustrated in FIG. 4, the onboard unit 28 includes a CPU 40, ROM 42, RAM 44, storage 46, a communication interface (communication I/F) 48, and an input/output interface (input/output I/F) 50. These respective configurations are communicably connected to each other via an internal bus 52.

The CPU 40 is a central processing unit that executes various programs and controls various components. Namely, the CPU 40 reads a program from the ROM 42 or the storage 46, and executes the program using the RAM 44 as a workspace. Further, the CPU 40 controls the respective configurations described above and performs a variety of computation processing in accordance with programs stored in the ROM 42 or the storage 46.

The ROM 42 stores various programs and various data. The RAM 44 serves as a workspace to temporarily store programs and data. The storage 46 is configured by an HDD or an SSD, and is a non-transitory storage medium that stores various programs including an operating system, as well as various data.

The communication I/F 48 is an interface for the onboard unit 28 to communicate with a server and other devices and, for example, a protocol such as a controller area network (CAN), Ethernet (registered trademark), long term evolution (LTE), a fiber distributed data interface (FDDI), or Wi-Fi (registered trademark) is used.

A navigation system 44, the first display 24, the second display 25, and the head-up display device 46 are connected to the input/output I/F 50. Moreover, the head-up display device 46 projects an image onto the third display 26.

The navigation system 44 holds map data in advance, and formulates a travel route to a destination set by an occupant or the like. The navigation system 44 also performs various guidance so as to enable the vehicle 11 to travel along a set travel route.

Functional Configuration of the Information Processing Device 10

The information processing device 10 implements various functions using the above-described hardware resources. Explanation follows regarding functional configurations implemented by the information processing device 10, with reference to FIG. 5.

Figure 5:
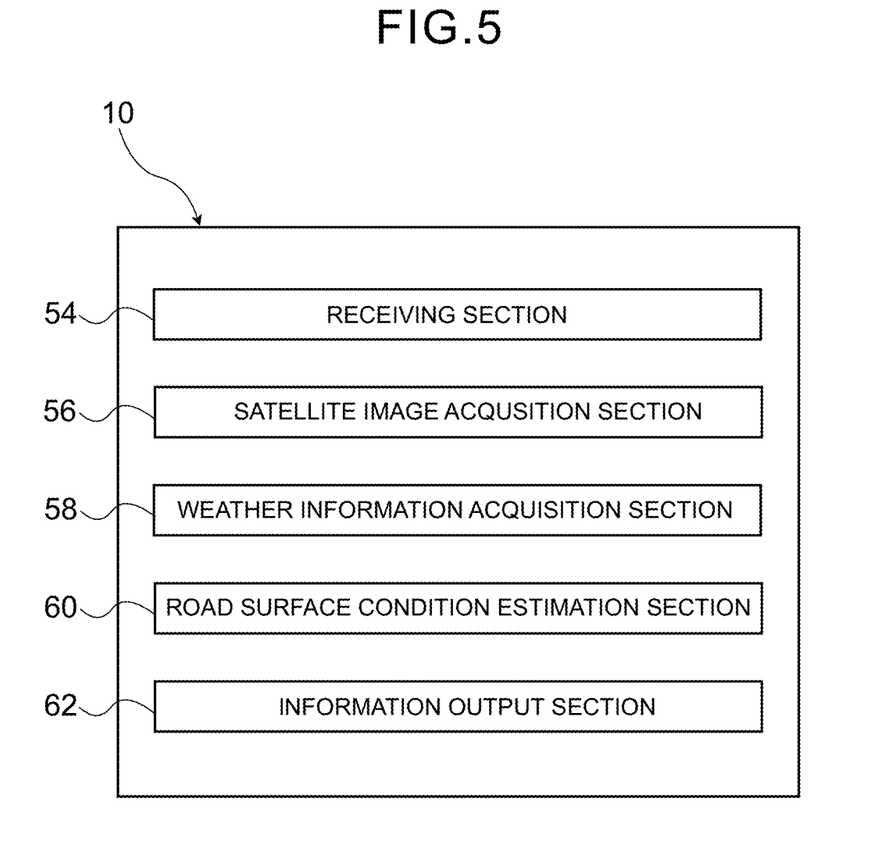
FIG. 5 is a block diagram illustrating a functional configuration of an information processing device according to an exemplary embodiment.

As illustrated in FIG. 5, the functional configuration of the information processing device 10 includes a receiving section 54, a satellite image acquisition section 56, a weather information acquisition section 58, a road surface condition estimation section 60, and an information output section 62. Note that the respective functional configurations are implemented by the CPU 30 reading and executing programs stored in the ROM 32 or the storage 36.

The receiving section 54 receives a request for information relating to the road surface condition. For example, when a route to a destination is set by the operation of an occupant of the vehicle 11, the onboard unit 28 instructs the information processing device 10 to estimate the road surface condition on the route to the destination. The receiving section 54 receives the instruction to estimate such a road surface condition.

The satellite image acquisition section 56 acquires a satellite image that is captured by an artificial satellite. More specifically, the satellite image acquisition section 56 accesses the server 12 to acquire a satellite image corresponding to an area from a current location of the vehicle 11 to a destination, from among the satellite images stored in the server 12. The satellite image acquired by the satellite image acquisition section 56 is, for example, at least one of a visible image, an infrared image, a water vapor image, a cloud-top emphasized image, a true color reproduction image, or an RGB composite image.

The weather information acquisition section 58 acquires weather information of a region which corresponds to the satellite image, from among the weather information stored in the server 12. The weather information acquired by the weather information acquisition section 58 is, for example, at least one of weather, temperature, humidity, wind speed, wave height, amount of snowfall, or natural disaster information. Further, the weather information acquired by the weather information acquisition section 58 may be data of the ground surface temperature observed by an artificial satellite.

The road surface condition estimation section 60 estimates a road surface condition of the road based on the satellite image and the weather information. More specifically, based on the information including the satellite image that is acquired by the satellite image acquisition section 56 and the weather information that is acquired by the weather information acquisition section 58, the road surface condition estimation section 60 estimates the road surface condition of the travel route from the current location of the vehicle 11 to the destination, and the road surface condition on the peripheral roads of the travel route.

For example, in a case in which a portion in which the travel route is white is detected based on the satellite image, and snowfall is confirmed from weather information in the same region, the road surface condition estimation section 60 estimates that snow has accumulated on the road surface. At this time, the amount of snowfall on the road surface may be estimated by acquiring the amount of snowfall from the weather information.

Moreover, in a case in which, based on the satellite image, a portion in which the travel route is a color of dead leaves, which is different from the color of a normal road surface, is detected, and it is confirmed from weather information in the same region that strong wind was blowing, the road surface condition estimation section 60 estimates that the road surface is covered with fallen leaves. At this time, based on the type of trees, humidity, or the like in the vicinity of the road, the degree of risk of slipping of the vehicle 11 due to fallen leaves may be estimated.

Further, in a case in which a portion in which the travel route is slightly whiter than a normal road surface is detected based on the satellite image, and it is confirmed from the weather information in the same region that the air temperature is below freezing point, the road surface condition estimation section 60 estimates that the road surface is frozen. At this time, in a case in which a pool of water has been detected from the satellite image, it may be estimated that the road surface is at a high risk of the water pool being frozen and the vehicle 11 slipping.

The road surface condition estimation section 60 may estimate a condition in which the travel route is submerged, the presence of a dropped object on the travel route, the temperature of the road on the travel route being extremely high, and depressions or the like on the road of the travel route.

The information output section 62 outputs the information relating to the road surface condition of the relevant region, which is estimated by the road surface condition estimation section 60. More specifically, the information output section 62 of the present exemplary embodiment causes display of the information relating to the road surface condition on at least one of the display area V1, the display area V2, or the display area V3 which are provided inside the vehicle cabin.

Figure 6:
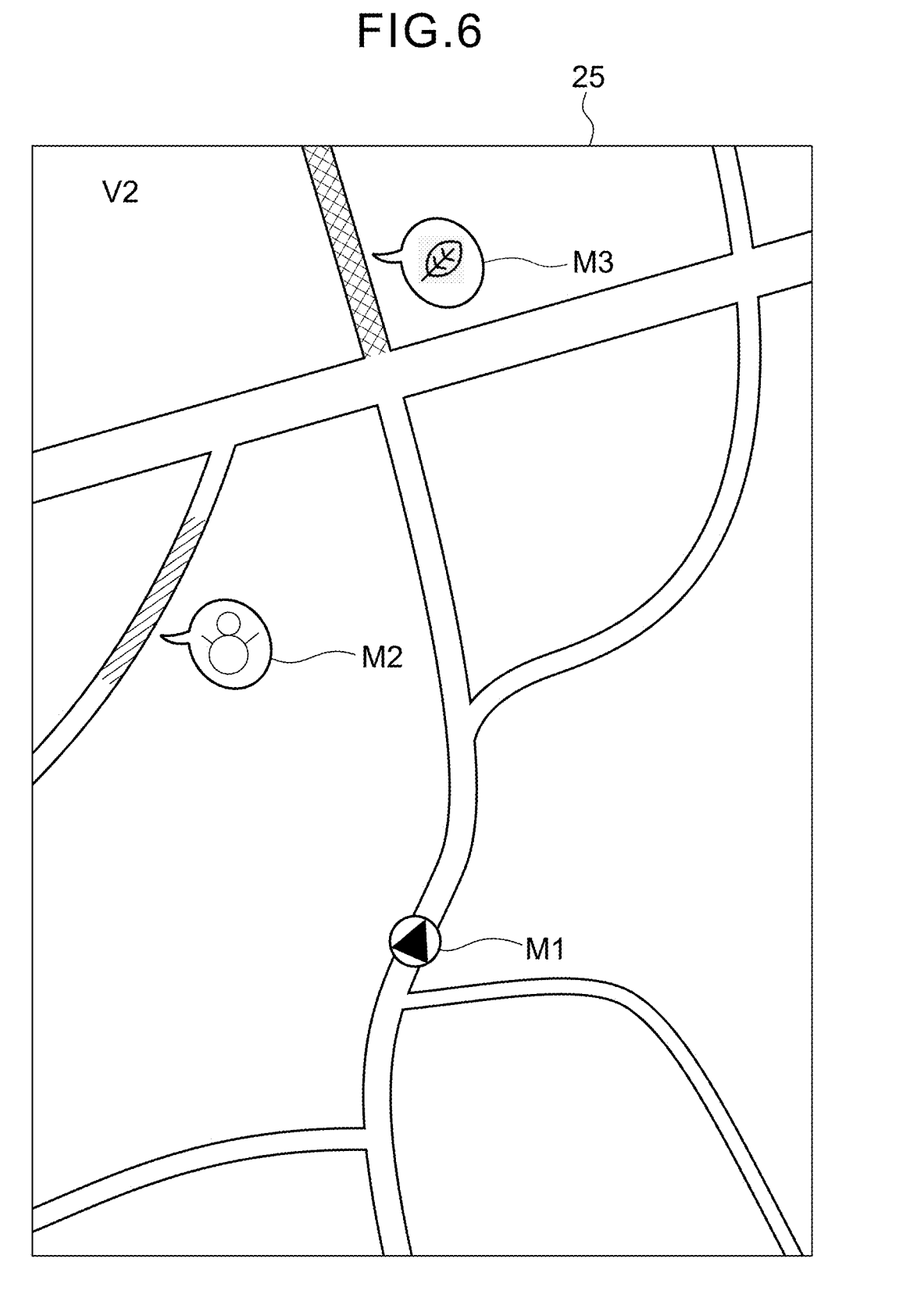
FIG. 6 is a diagram illustrating a display example that is displayed at a display area in an exemplary embodiment.

FIG. 6 is a diagram illustrating a display example that is caused to be displayed at the display area V2 by the information output section 62. As illustrated in FIG. 6, map information is displayed at the display area V2 by the navigation system 44. The mark M1 indicates the current location of the vehicle 11.

A road on which snow has accumulated is shown in FIG. 6. The mark M2 indicates a road on which snow has accumulated. Further, the mark M3 indicates a portion in which fallen leaves have accumulated to cover the road. In this manner, in the present exemplary embodiment, the information output section 62 causes display of map information of surroundings of the vehicle 11 at the display area V2, and also causes display of information relating to the road surface conditions by adding information to the map information. Note that the same display as in FIG. 6 may be performed at the display area V1 and at the display area V3. Alternatively, information such as the location of a road that is estimated to be frozen may be displayed.

Operation

Next, explanation follows regarding operation of the present exemplary embodiment.

Display Processing

Figure 7:
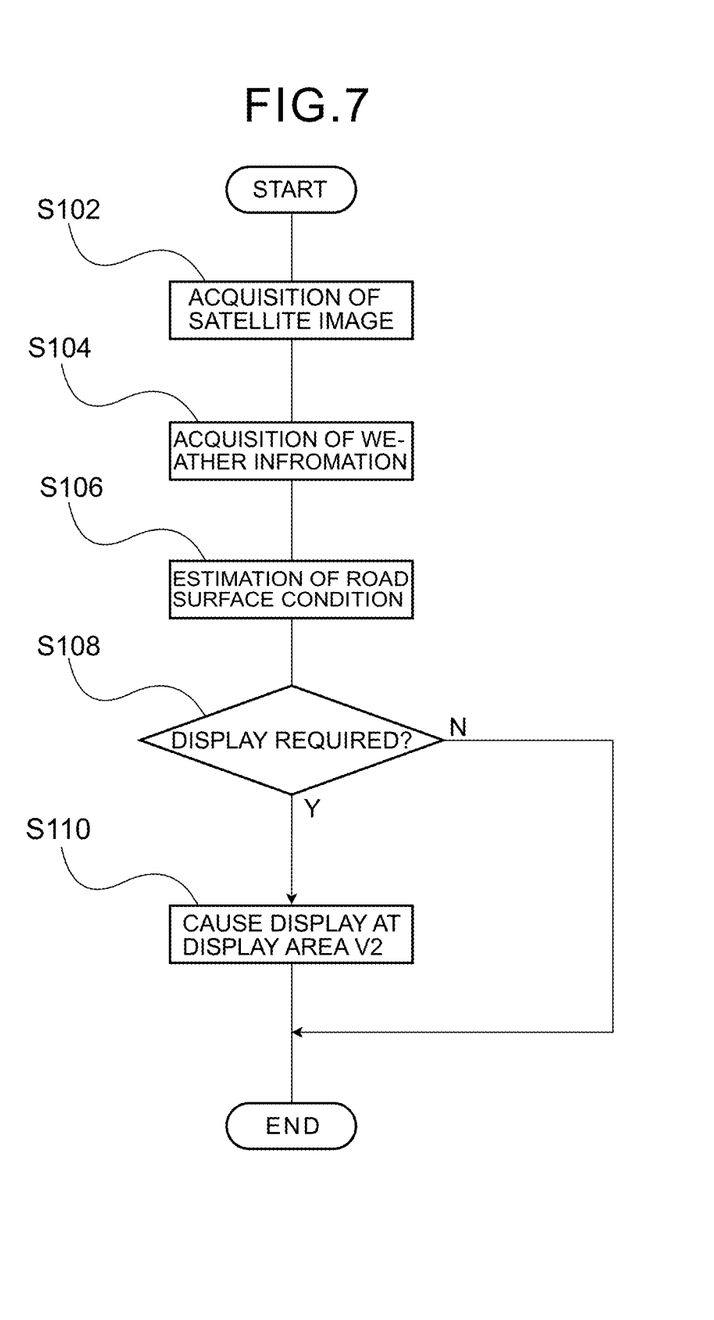
FIG. 7 is a flowchart illustrating an example of a flow of display processing in an exemplary embodiment.

Explanation follows regarding an example of display processing in which information relating to the road surface condition is caused to be displayed at the display area V2, with reference to the flowchart illustrated in FIG. 7. The display processing is executed by the CPU 30 reading a display program from the ROM 32 or the storage 36, and loading and executing the display program in the RAM 34. Note that in the present exemplary embodiment, as an example, the display processing is executed when a travel route is displayed, after a destination has been set by a user. Further, the display processing is executed at predetermined intervals so as to cause display of the latest information at the display area V2.

At step S102, the CPU 30 acquires a satellite image. More specifically, using the functionality of the satellite image acquisition section 56, the CPU 30 acquires a satellite image corresponding to an area from a current location of the vehicle 11 to a destination.

The CPU 30 acquires weather information at step S104. More specifically, using the functionality of the weather information acquisition section 58, the CPU 30 acquires weather information for a region corresponding to the satellite image.

At step S106, the CPU 30 estimates the road surface condition. More specifically, using the functionality of the road surface condition estimation section 60, the CPU 30 estimates the road surface condition on the travel route from the current location of the vehicle 11 to the destination.

The CPU 30 then determines at step S108 whether or not display is required. More specifically, in a case in which the information relating to the road surface condition estimated at step S106 is not required by the user, the CPU 30 determines that display is unnecessary. For example, in a case in which there is no risk of slipping or the like with respect to a road surface condition on a travel route from the current location of the vehicle 11 to a destination, the road surface temperature is between a predetermined upper limit value and a predetermined lower limit value, and no dropped object or the like is detected, the CPU 30 determines at step S108 that display is unnecessary. In this case, the CPU 30 ends the display processing without transitioning to the processing of step S110.

On the other hand, in a case in which there is a change in the road surface condition on the travel route from the current location of the vehicle 11 to the destination, the CPU 30 determines that display is required, and transitions to the processing of step S110. At step S110, the CPU 30 causes display of the information relating to the road surface condition at the display area V2. Namely, the information relating to the road surface condition is displayed on the travel route and the peripheral roads of the travel route on the map that is displayed at the display area V2.

In the manner described above, the information processing system S and the information processing device 10 according to the present exemplary embodiment estimate the road surface condition based on the satellite image captured by the artificial satellite 13 and the weather information. Since the artificial satellite can capture an image of a wide range of road surfaces of an arbitrary region, the road surface condition of a wide range of roads can be estimated. Further, by outputting the information relating to the estimated road surface condition, a user can grasp the road surface condition.

Further, in the present exemplary embodiment, the information relating to the road surface condition is displayed at at least one of the display area V1, the display area V2, or the display area V3 inside the vehicle cabin, enabling an occupant of the vehicle to grasp the road surface condition.

Moreover, in the present exemplary embodiment, since the information relating to the road surface condition is displayed on the map that is displayed at the display area, an occupant can easily grasp the road surface condition simply by looking at the map information. In particular, roads that require attention regarding slipping due to freezing, roads that require attention regarding slipping due to fallen leaves, and roads that require preparation in advance due to snowfall can be grasped before travel.

Furthermore, using the satellite image as in the present exemplary embodiment enables the information relating to the road surface condition to be grasped similarly to other regions, even in depopulated areas with fewer cars or the like.

Although explanation have been given regarding the information processing system S and the information processing device 10 according to the exemplary embodiment, obviously various embodiments may be implemented within a range not departing from the gist of the present disclosure. For example, although the information relating to the road surface condition is added to the map information and displayed in the above-described exemplary embodiment as illustrated in FIG. 6, there is no limitation thereto. The information relating to the road surface condition may be displayed at the display area using characters or the like. In this case, in a case of a change in the road surface condition of the road on which the vehicle 11 is currently travelling, the occupant may be notified in advance of the change in the road surface condition.

Although explanation has been given regarding a configuration in which information is displayed at the display area V1, the display area V2, or the display area V3 inside the vehicle cabin, there is no limitation thereto. For example, the information may be output to a terminal carried by the user. In this case, even a user such as a pedestrian can grasp the road surface condition.

Although the information relating to the road surface condition of the current travel route is displayed in the above-described exemplary embodiment, there is no limitation thereto. For example, information relating to a road surface condition several hours ahead of time may be displayed. Note that by acquiring weather information for several hours ahead of time as the weather information, the road surface condition for several hours ahead of time can be estimated.

Further, in the above-described embodiment, any of various types of processors other than the CPU 30 may execute the processing that the CPU 30 executes by reading a program. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors, for example, the above-described processing may be executed by plural FPGAs, or a combination of a CPU and an FPGA, or the like. Further, a hardware configuration of the various processors is specifically formed as an electric circuit combining circuit elements such as semiconductor elements.

In addition, although various data is stored in the storage 36 in the above-described exemplary embodiment, there is no limitation thereto. For example, a storage section may be a non-transitory storage medium such as a compact disc (CD), a digital versatile disc (DVD), or universal serial bus (USB) memory. In this case, various programs, data, and the like are stored in these storage media.

Moreover, the flow of processing described in the above-described exemplary embodiment is an example, and unnecessary steps may be deleted, new steps may be added, or the processing order may be rearranged within a range not departing from the spirit of the present disclosure.

What is claimed is:

1. An information processing device comprising:
a processor, wherein the processor is configured to:
acquire a satellite image captured by an artificial satellite;
acquire weather information for a region corresponding to the satellite image;
output information relating to a road surface condition for the region, which is estimated based on the satellite image and the weather information;
output information including a location of a road that is covered with fallen leaves, as the information relating to the road surface condition; and
estimate a degree of risk of slipping by a vehicle due to fallen leaves based on at least one of types of trees or humidity.

2. The information processing device according to claim 1, wherein the processor is configured to cause display of the information relating to the road surface condition at a display area that is provided inside a vehicle cabin.

3. The information processing device according to claim 2, wherein the processor is configured to cause display of map information for vehicle surroundings at the display area, and to cause display of the information relating to the road surface condition on the map information.

4. The information processing device according to claim 1, wherein the processor is configured to output information including a location of a road that is estimated to be frozen, as the information relating to the road surface condition.

5. The information processing device according to claim 1, wherein the processor is configured to output information including a location of a road in which snow has accumulated, as the information relating to the road surface condition.

6. An information processing system comprising:
the information processing device according to claim 1; and
a display device that causes display of the information relating to the road surface condition at a display area that is provided inside a vehicle cabin.

7. An information processing method comprising, by a processor:
acquiring a satellite image captured by an artificial satellite;
acquiring weather information for a region corresponding to the satellite image;
outputting information relating to a road surface condition for the region, which is estimated based on the satellite image and the weather information;
outputting information including a location of a road that is covered with fallen leaves, as the information relating to the road surface condition; and
estimating a degree of risk of slipping by a vehicle due to fallen leaves based on at least one of types of trees or humidity.

8. A non-transitory storage medium storing a program that is executable by a computer to perform processing, the processing comprising:

acquiring a satellite image captured by an artificial satellite;
acquiring weather information for a region corresponding to the satellite image;
outputting information relating to a road surface condition for the region, which is estimated based on the satellite image and the weather information;
outputting information including a location of a road that is covered with fallen leaves, as the information relating to the road surface condition; and
estimating a degree of risk of slipping by a vehicle due to fallen leaves based on at least one of types of trees or humidity.

* * * * *